Jan. 3, 1933.  K. E. PEILER  1,893,060
FOREHEARTH FOR MOLTEN GLASS
Filed Aug. 21, 1929  5 Sheets-Sheet 1

Witnesses:
G. A. Duberg
A. A. Horn

Inventor
Karl E. Peiler
by Brown & Parham
Attorneys.

Jan. 3, 1933.  K. E. PEILER  1,893,060
FOREHEARTH FOR MOLTEN GLASS
Filed Aug. 21, 1929  5 Sheets-Sheet 4

Witnesses:
G. A. Duberg
Jas. G. White

Inventor
Karl E. Peiler
by Brown & Parham
Attorneys.

Jan. 3, 1933.  K. E. PEILER  1,893,060
FOREHEARTH FOR MOLTEN GLASS
Filed Aug. 21, 1929  5 Sheets-Sheet 5

Witnesses:
G. A. Duburg
A. A. Horn

Inventor
Karl E. Peiler
by Brown & Parham
Attorneys.

Patented Jan. 3, 1933

1,893,060

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

FOREHEARTH FOR MOLTEN GLASS

Application filed August 21, 1929. Serial No. 387,285.

My invention relates to the manufacture of glassware and particularly to apparatus for and methods of conditioning the molten glass and presenting it to the charge gathering or delivery apparatus. It has special reference to the control of temperature and viscosity of the glass not only while the glass is being transferred from a melting furnace or other container to the zone at which individual mold charges are removed, but while it is in such zone and while portions of the glass are undergoing reheating after having been in such zone.

Still more particularly, my invention relates to a suitable forehearth provided with a gathering bay adapted for use with shaping machines which gather their charges by the well-known suction method.

Heretofore, it has been customary in the practice of the suction gathering method to provide a rotating pot into which glass from the melting furnace flows and from which the glass is gathered by a succession of molds successively dipped into the rotating body of glass. It has also been suggested that charges of glass gathered by the suction method may be obtained by projecting or passing successive suction gathering molds directly into the refining chamber of the melting furnace or into an open bay attached thereto. These two methods suffer from serious disadvantages in the economic production of glassware. The rotating pot, although giving good results, is necessarily of large size for various reasons, and requires a great investment and large cost of operation and has other disadvantages.

In gathering with suction gathering molds of a shaping machine, or with other suction receptacles, directly from the refining chamber of a melting furnace or from a gathering bay formed immediately adjacent thereto, or from any exposed pool contained in a mere projection of the refining chamber of the melting furnace, various difficulties are met. It is not economical to control the temperature and viscosity of the glass gathered in this manner because such temperature and viscosity have to be controlled by controlling and varying the temperature of the refining end of the glass melting furnace. Moreover, in many instances such control of temperature is impossible on account of draft conditions existing in the furnace and on account of variation in such conditions from time to time. Even if the temperature and viscosity could be controlled by proper control of the furnace conditions, it would still be possible to provide glass for a plurality of shaping machines at only one and the same temperature at any one time and therefore it would not be possible, under these conditions, to supply glass at different temperatures and viscosities to the respective different shaping machines which might require such different temperatures and viscosities of glass. In normal operation, where a plurality of shaping machines have to be supplied from one melting furnace, it is extremely desirable to be able to supply glass of different temperatures and viscosities to the different shaping machines to suit the requirements of such individual shaping machines. Another one of the above-mentioned difficulties is that of adequately heating the gathering zone or exposed portion of the gathering pool and of controlling its temperature. Still another of the above-mentioned difficulties is the lack of uniformity in the temperature and viscosity of glass supplied to the gathering zone from which the gathering molds or receptacles take their supply of molten glass.

It is extremely important for suction fed shaping machines to be supplied with glass at the proper temperature and viscosity and in a homogeneous condition. If this is not done, a large portion or all of the ware produced by the shaping machine may be defective or the machine may not be able to produce any ware at all.

In the practice of the suction gathering method, it is also necessary to suitably control the disposal and reassimilation of those portions of the glass coming into contact with the gathering receptacles and the shears and which are chilled by that contact. These portions of the glass, hereinafter referred to as "bits", must be suitably reheated and reassimilated in the general body of glass before they again approach the gathering zone.

Generally speaking, my invention provides suitable extensions of a glass melting furnace, one for each suction gathering machine, quite similar in many ways to an improved type of feeder forehearth heretofore invented by me and in which an accurate local control of temperature within the extension or forehearth may be had.

Certain broad features of the herein shown embodiments of my invention are common to that embodiment and to certain of my earlier feeder forehearth constructions, such construction being shown and described in my U. S. patent applications, Serial No. 294,792 and filed May 5, 1919 now Patent No. 1,655,391; Serial No. 683,576, filed Dec. 31, 1923 now Patent No. 1,760,254; and Serial No. 236,025, filed Nov. 30, 1927, of which applications the present application is a continuation in part.

The embodiments of my invention herein shown also includes certain features common to certain earlier suction feeding forehearths designed by me and to the circulation of glass therein, such earlier means being set forth in my U. S. applications, Serial No. 114,089, filed June 7, 1926, now Patent No. 1,721,487; Serial No. 114,881, filed June 10, 1926 now Patent No. 1,791,634; Serial No. 114,882, filed June 10, 1926, now Patent No. 1,791,635; Serial No. 114,883, filed June 10, 1926, now Patent No. 1,791,636; Serial No. 272,956, filed April 26, 1928 now Patent No. 1,828,718 and U. S. application filed jointly by me and W. T. Barker, Jr., Serial No. 218,398, filed Sept. 9, 1927 now Patent No. 1,828,717, and as to these common features, this present application is also a continuation.

The general object of the invention is to provide a new and improved forehearth which will supply molten glass to associated shaping machines in the best condition as to temperature, viscosity and homogeneity.

More particularly, the object is to provide such a forehearth with a projecting bay exposing the glass at a gathering zone and especially adapted to the gathering of charges by the suction method in the best condition for use in the subsequent ware forming operations.

A more specific object is to provide such a forehearth having improved means for controlling the temperature of the glass approaching the delivery point and particularly for insuring the uniform distribution of temperature and viscosity in the glass, going to form the several charges.

Another object of the invention is to provide such a forehearth wherein the temperature may be regulated and controlled independently of the temperature conditions in the melting furnace to which the forehearth is attached, so that the desired conditions may be maintained in the forehearth, as well as in its gathering bay in spite of various conditions of draft, temperature and glass level existing in the melting furnace, and so that desired different conditions may be maintained in a plurality of such forehearths attached to the same furnace, and glass of different temperatures and viscosities may be gathered by a plurality of shaping machines supplied from the same melting furnace.

Another object of my invention is to provide such a forehearth in which the distribution of heat may be controlled at will, so that different local effects may be secured to meet varying operating conditions.

More specifically, it is the object to provide such a forehearth having means for controlling the distribution of flames or currents of heating gases therein and particularly to control the direction and character of such flames or currents, both in the fire space of the forehearth and out over the gathering zone.

Another object of the invention is to provide a gathering bay in which a portion of the surface of the glass is exposed for the gathering operation, and in which the chilling effects of the walls and bottom of such gathering bay are minimized by means of efficient heat insulation to prevent the formation of chilled streaks of glass which not only might detract from adequate circulation of the glass in the gathering pool but would also tend to cause streaks or cords in the glass sucked up into the gathering molds or receptacles, and might even under some conditions interfere with such gathering operations. The provision of adequate insulation at these points, in combination with suitable bracing, provides a practical structure for maintenance of the most desirable conditions at the gathering zone and the production of the best quality of ware by the shaping machine supplied therefrom.

A further object of the invention is to provide such a forehearth having means specifically adapted for controlling the extent of out-flow of hot gases known as "sting-out" toward and over an exposed gathering surface or zone and for controlling an alternative in-draft from over such zone. More specifically, it is an object of the invention to provide such a forehearth having a barrier or curtain wall which is adjustable to various heights whereby to aid in controlling the temperature conditions in the glass at the gathering zone either by radiation or by projected hot gases. A further object is to provide such a forehearth having barrier or curtain wall composed of individually adjustable sections, whereby desired local control of the radiation, sting-out and in-draft may be obtained.

A still further object of the invention is to provide a forehearth of novel shape and design and having such temperature and circulation controls as to efficiently dispose of the "bits" or other chilled portions of the glass and to effect their reheating and reassimilation in the mass of the glass from which the charges are gathered.

A still further object of my invention is to provide in such a forehearth proper structural features for supporting and holding it in connection with a glass melting furnace and for permitting expansion and contraction and securing the desired alignment of parts.

A further object is to provide novel methods of conditioning the glass and of circulating it, whereby chilled glass is properly disposed of without returning it to the furnace.

Other and further objects of the invention will hereinafter appear from the detailed description of the embodiments of my invention as illustrated in the accompanying drawings, in which.

Figure 1:
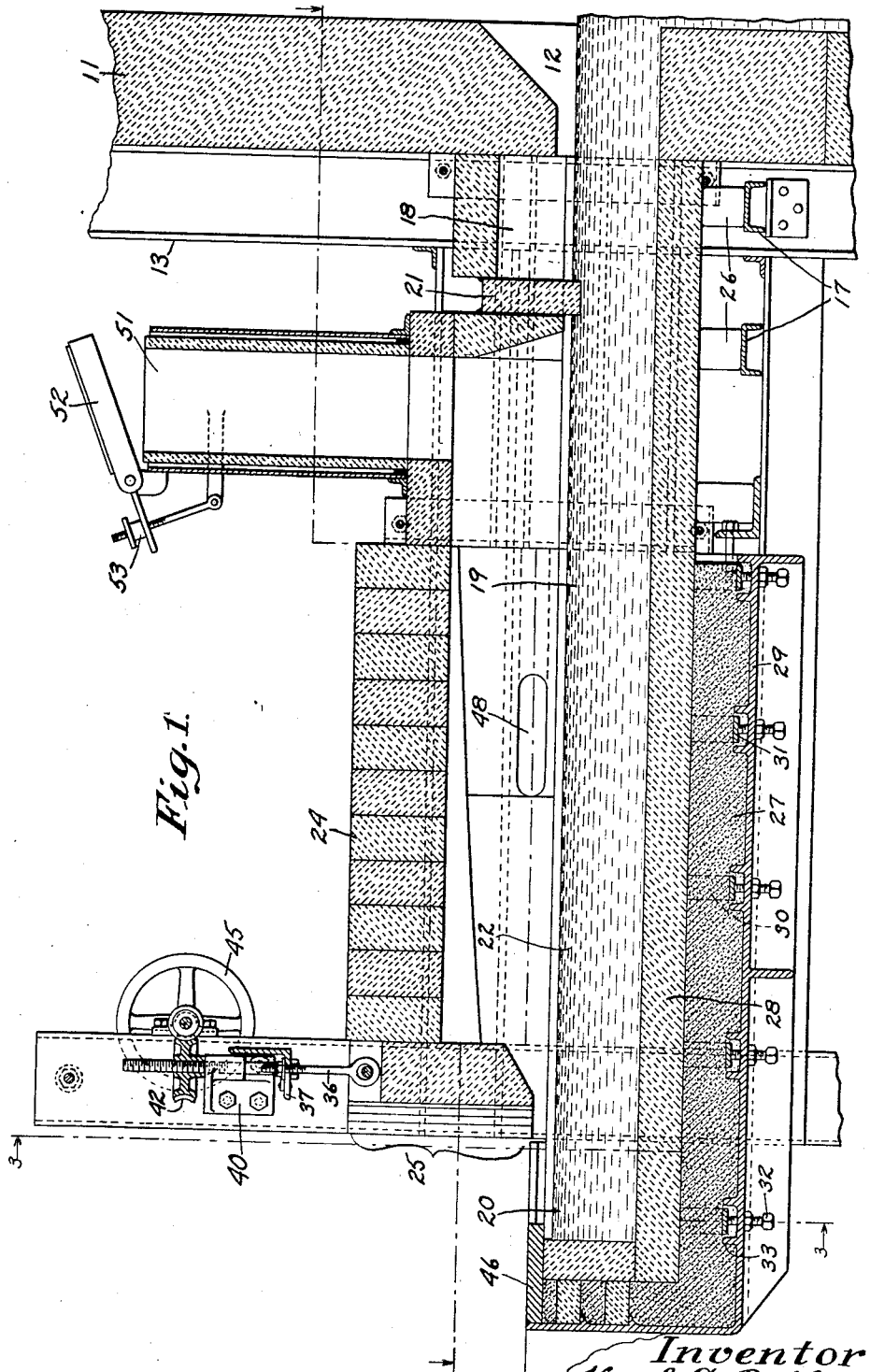
Figure 1 is a longitudinal vertical sectional view of a forehearth pool embodying the mechanical features of my invention.

Generally I propose a provision for use with each suction gathering machine to be used in connection with a given furnace, of an extension or forehearth containing a pool of melted and refined glass supplied from the furnace. The pool extends out under a barrier into a gathering bay where a portion of its surface is exposed at a gathering zone where suction molds or receptacles may be charged. The glass flows into the pool by gravity from the melting furnace and is maintained therein at substantially the level of the glass in the furnace, but the fire space in the forehearth is completely separated above the glass line from communication with the fire space in the furnace. Therefore, the fire space in the forehearth may be fired and may have its draft conditions suitably established for proper control independently of the draft conditions and temperatures existing in the furnace. This is extremely important, as a small leakage of air or gases between the fire space in the forehearth and the fire space in the furnace would serve to destroy the necessary control in the forehearth. To permit the regulation and distribution of fire in the fire space of the forehearth, oil or gas burners with a regulable supply of fuel and air are provided, and a stack with an adjustable damper to carry off combustion products and supply a regulable draft is provided. By properly proportioning the supply of fuel and air provided by the burners and by properly setting the stack damper, the character and distribution of the fire in the fire space of the forehearth may be regulated as desired. These features may also be used in connection with the setting of the barrier under which the pool of glass projects to the exposed gathering zone, as will be hereinafter described. The fire and draft controls permit the regulation of the temperature and viscosity of the glass supplied to the gathering zone by the forehearth independently of the conditions existing in the melting furnace. Therefore glass of desired temperature and viscosity may be supplied at will to the shaping machines.

At its outer end the forehearth is provided with a projecting gathering bay in which the pool of molten glass may be exposed to a greater or less degree at a gathering zone for coaction with suction molds or receptacles. The space over the gathering bay is partitioned off from the fire space in the forehearth by a downwardly projecting barrier or curtain, commonly known as a "jack-arch", which in effect forms an end wall for the fire space of the forehearth. This barrier is raised above the surface of the glass to provide a definite space between it and the glass. This permits radiation from the fire space in the forehearth out toward the front of the gathering bay and particularly to the surface of the glass in the gathering bay, thereby assisting in heating this glass, particularly at the gathering zone. It also permits the issuance of flames or hot gases out from under the barrier over the gathering bay, or on the other hand permits an indraft of cold air under the barrier into the fire space or permits the maintenance of a neutral condition under the barrier according to the draft conditions which exist in the fire space in the forehearth with respect to the outer air. These draft conditions may be controlled by the relative proportioning of the burner settings, damper settings, and the clearance space between the barrier and the surface of the glass. This enables a control of the temperature of the glass at the gathering zone and of the temperature conditions in the gathering bay. If desired, the adjustments may be made so that the draft condition under the barrier is just neutral, and there is neither outflow nor inflow of gases or air. Under these conditions heat supplied to the surface of the glass in the gathering bay would be by radiation only. On the other hand, the adjustments may be set so that there is a projection or "sting-out" of flames or hot gases under the barrier to any desired extent across the surface of the glass in the gathering bay, reaching clear to the outer edge of the gathering bay if desired. This effect may be made to assist in reheating the chilled portion of glass left by the gathering operation.

In addition to the above means of controlling the drafts at the barrier and the heating of the gathering pool, I provide for raising or lowering the entire barrier, thus regulating the space between the lower end of the barrier and the glass. This adjustment has two effects: it may be used to control the amount of radiation which is permitted to reach the surface of the glass in the gathering bay from the interior of the forehearth, and it may also be used to assist in regulating the amount of fire or hot gases projected out over the surface of the glass in the gathering bay from the interior of the forehearth. By combining this adjustment of the barrier with the other adjustments— namely, of burners and stack dampers—various effects may be secured.

In addition to the vertical adjustment of the barrier as a whole, I provide for adjusting the vertical position of individual blocks in the barrier. This permits the local effects to be adjusted. For instance, more or less radiation or more or less fire may be supplied to local portions of the gathering bay, as desired. This permits variation in temperature of different portions of the glass in the gathering bay to be obtained or to be altered. If, for instance, one end of the gathering bay runs too cold or too hot, the effect of the fire or of the radiation may be changed to influence this locally and to change the temperatures as desired. These individual block adjustments may be used in conjunction with the adjustment of the barrier as a whole and in conjunction with the burner and damper adjustments.

Suitable provisions are made for support of the forehearth and for expansion and alignment of the parts. The supports are arranged so that the glass containing parts may be braced and held properly in place and so that expansion and contraction may be provided for. The glass containing parts are supported in such a manner that they may be properly insulated and so that heat losses may be minimized and the most nearly uniform conditions of temperature and viscosity may be maintained as desired. For instance, both the front and bottom of the gathering bay are adequately insulated so as to minimize the effect of the lining of cold glass which would otherwise exist at these points. This permits an easier circulation of the glass and tends to prevent cords or streaks in the glass which is gathered up into the suction molds or receptacles. The pool may be so shaped as to provide a relatively narrow passage for the glass from the furnace and to thereafter flare outwardly as it approaches the exposed portion from which the gathering takes place. This permits its connection between the buck stays of the usual furnace and at the same time permits the required area of exposed portions to co-act properly with the shaping machine. The relatively narrow passage from the furnace also tends to confine the circulation of glass from the gathering zone and to prevent cold bits from getting back into the melting furnace where they might sink and become devitrified and so cause trouble.

A circulation may be induced in the pool either by a movement of the molds of the shaping machine through the glass or by suitable paddles, displacers or other circulators, such for examples as are shown and described in certain of my aforementioned earlier applications.

Referring particularly to Figs. 1 to 4, inclusive, 11 represents the wall of a furnace wherein the glass is continuously melted and refined. 12 represents an opening in the wall 11 through which glass from the furnace passes into the gathering pool or forehearth.

The forehearth or pool structure is carried upon a steel scaffolding consisting of the furnace buck stays 13, additional vertical stays 14 and horizontally disposed angle irons 15, 16 and 17.

The forehearth comprises a communication section or extension 18, a temperature regulating section 19 and a gathering bay section 20.

Between the communication section 18 and the temperature regulating section 19 is interposed a skimmer and sealing block 21 which dips below the surface of the glass and seals off the upper portion of the chamber 19 from gases in and radiation from the furnace. To insure a perfect seal, luting of suitable material may be used in the joints between the block 21 and the adjacent structure.

Figure 2:
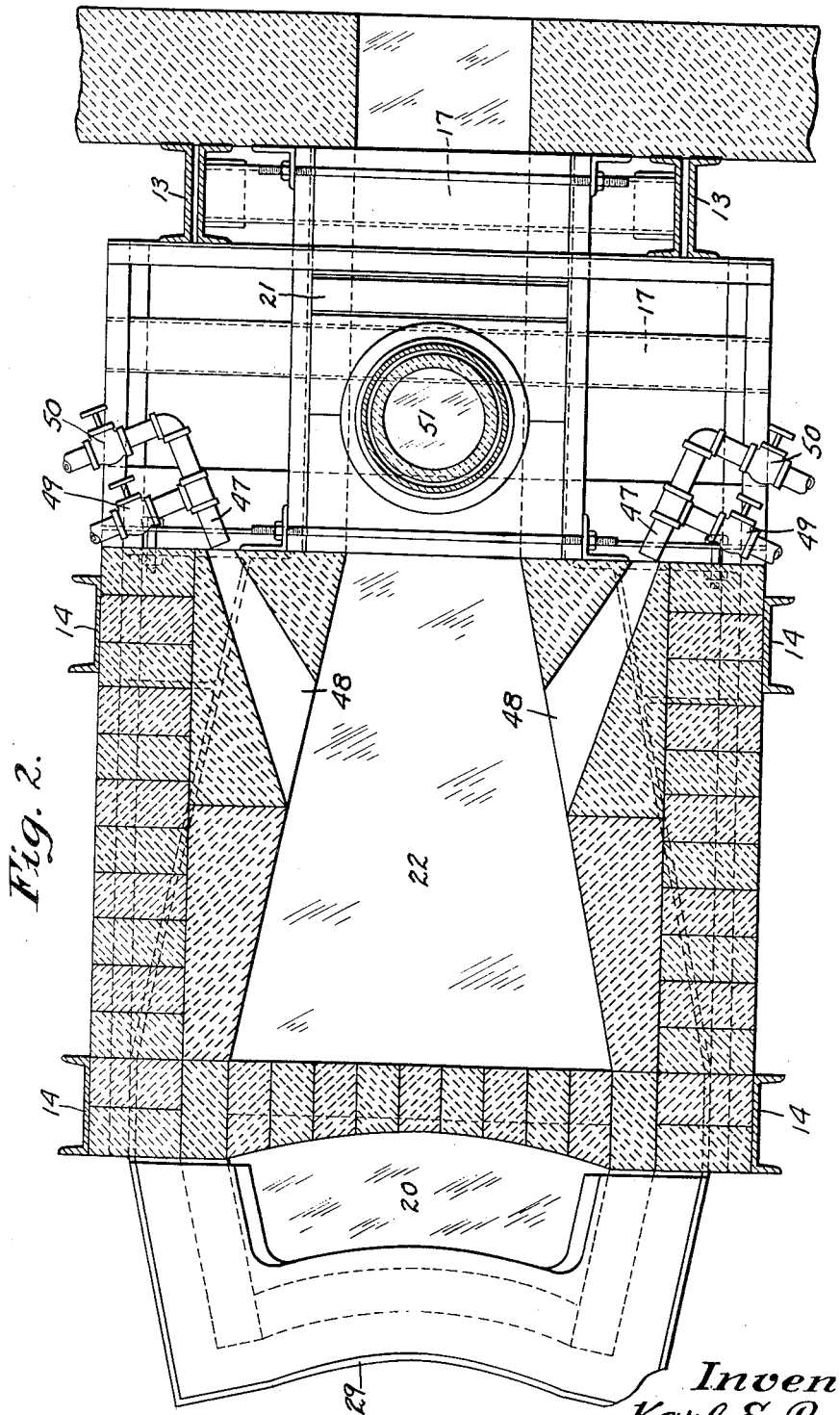
Fig. 2 is a view in horizontal section taken on the line 2—2 of Fig. 1.
Figure 3:
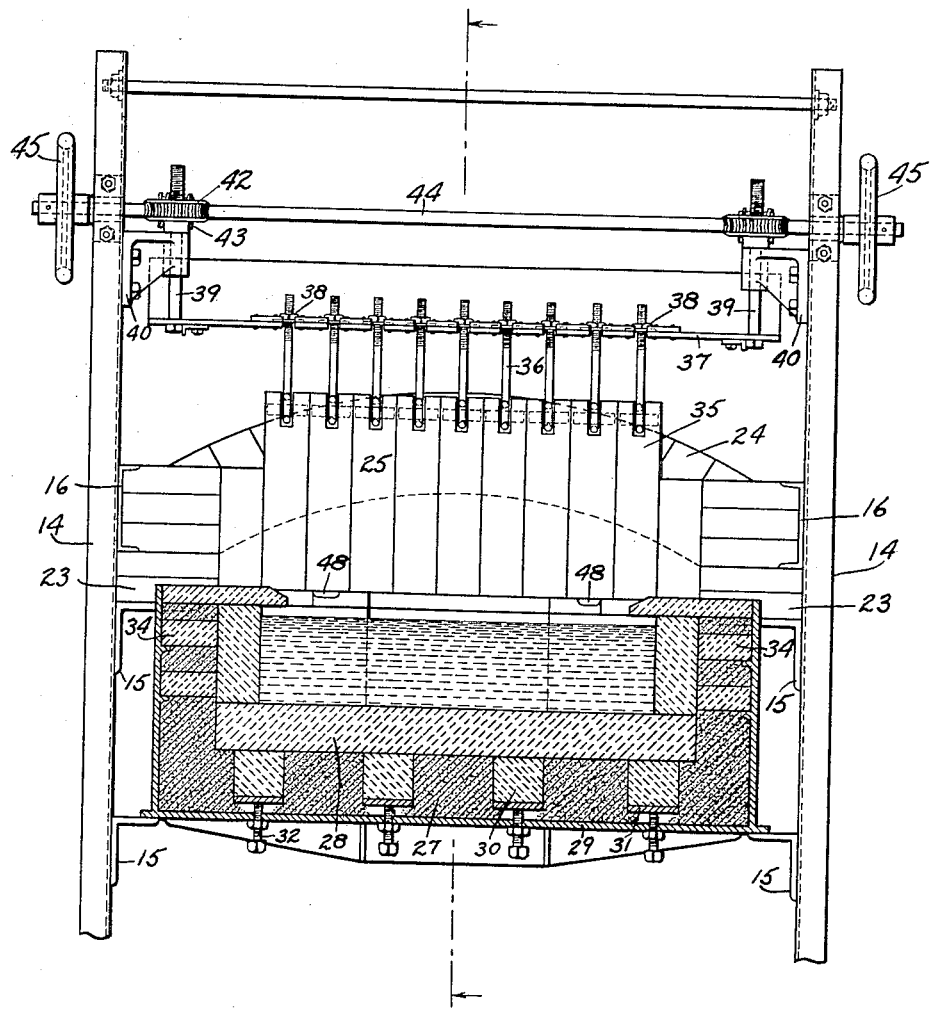
Fig. 3 is a front view in elevation, and partially in section, of the apparatus shown in Fig. 1 taken on the line 3—3 of that figure.
Figure 4:
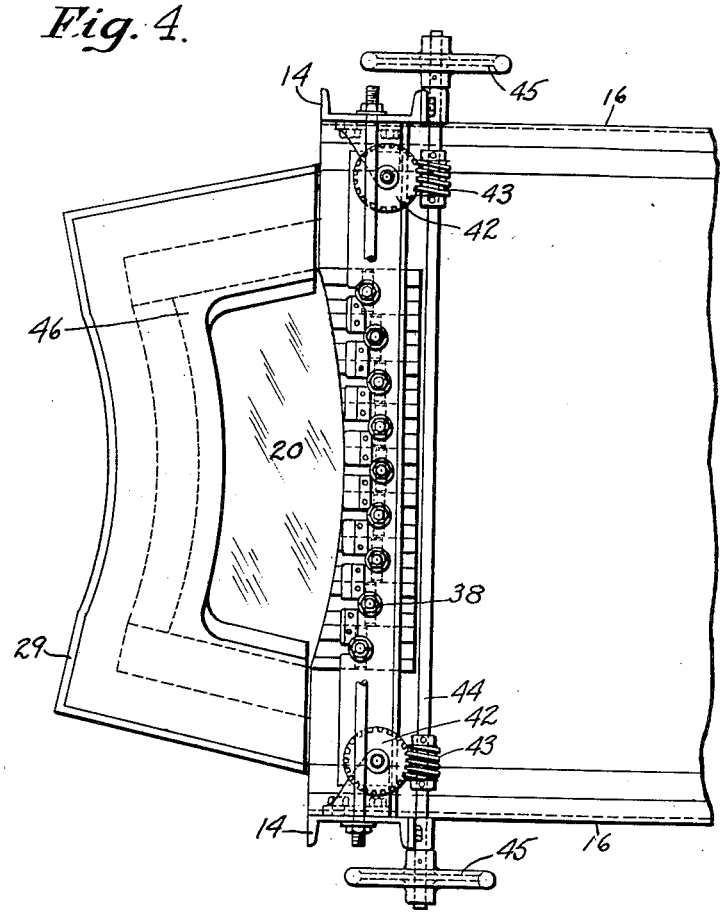
Fig. 4 is a view in plan of the forward portion of the apparatus shown in Fig. 1.

The pool container comprises a basin or receptacle, of refractory and glass resisting material having a glass channel 22 shaped as shown in Figs. 1 and 2 and covered in save as to the gathering bay section 20 by side walls 23 and an arch roof 24 of fire brick and by a barrier or curtain wall 25 hereinafter to be described.

Figure 7:
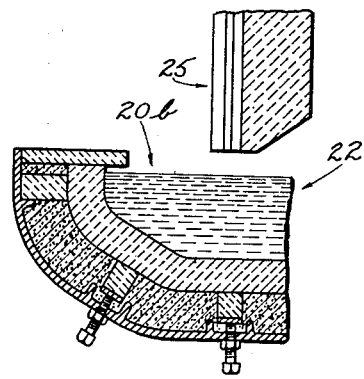
Fig. 7 is a view similar to Fig. 2 of the forward portion of a forehearth, otherwise similar to that shown in Figs. 1 to 4 inclusive, but showing a modified form of gathering bay.

The glass may be maintained in the channel 22 at any desired uniform depth, as shown in Fig. 1, or, if desired, the depth or selected portions of the channel may be increased or diminished to aid in promoting any desired circulation or to provide sufficient volume of glass to thoroughly assimilate the bits, or for any other reason. For example, the bottom may be sloped upwardly at the outer end of the channel, as shown for the gathering bay section 20b in Fig. 7, to provide not only an aid to circulation and the maintenance of a desired depth of glass at the gathering point, but to permit an outer construction which provides increased clearances for the associated machine parts.

Suitable regulable heating means are provided in connection with the enclosed portion for controlling the temperature and viscosity of the glass.

The rearward end of the forehearth is supported from the angle irons 17 through refractory supporting blocks 26 and any desired portion of this part of the container may be uninsulated to provide for any desired reduction in the temperature of the glass as it enters the forehearth. Save for this uninsulated portion, the basin is insulated by suitable insulation 27 disposed in the space between the glass resisting blocks 28 forming the lining of the container, and a metal casing 29 in which this lining 28 is supported on struts formed of refractory blocks 30. This holds the lining at a distance from the iron casing 29 and permits powdered insulating material, such as kieselguhr, to be packed between the lining 28 and the casing 29. The refractory blocks 30 rest on plates 31 which are carried on leveling screws 32 threaded in the metal casing 29. The supporting plates 31 may be prevented from rotating during the leveling operation by means of raised ledges 33 formed on the inside of the casing 29. In this way the lining 28 may be readily leveled to the desired height by means of the leveling screws 32 and its weight may be evenly distributed on the supports. Similarly the side walls of the lining 28 are braced against outward movement by refractory braces or struts 34 spaced between the lining 28 and the casing 29. These braces 34 are supported by ledges formed integral with the inside of the casing. As with the lower supports, so these braces 34 hold the lining 28 in place and provide a space between the lining and the casing which is preferably filled with heat insulating material in loose or powdered form, such as sil-o-cel. This insulation acts to minimize the heat loss and thereby to minimize the lining of cold glass on the inside of the glass resisting refractory lining 28.

The casing 29 is bolted back to the iron work at the rear of the forehearth which is in turn drawn back against the furnace iron work or buckstays 13. If desired the casing 29 may be bolted directly back to the buckstays 13 by means of adjustable bolts. In this way the forehearth and particularly its glass containing portion is securely held back against the melting furnace in spite of expansion and contraction of the furnace, and leakage at the joints is prevented.

The forehearth cover or roof formed by the arch 24 preferably ends short of the gathering bay 20 which projects beyond it and the space under the cover is separated from the space over the gathering bay by an adjustable barrier or curtain wall 25. This barrier is composed of a series of suitably shaped refractory blocks 35 which may be suspended side by side by individual threaded rods 36 which extend upwardly through a bearing bar 37 and are provided at their upper ends with adjusting nuts 38. The bearing bar 37 is in turn suspended by a pair of screw threaded rods 39. These rods pass respectively through holes in brackets 40 which are bolted to the forward pair of stays 14. Above the brackets 40 these rods screw into the threaded hubs of worm wheels 42 which mesh with worms 43 carried on the shaft 44 journaled in the stays 14 and provided with hand wheels 45. By turning the hand wheels 45 the worm wheels 42 are rotated and the rods 39 supporting the barrier or curtain wall 25 are screwed up or down, thus moving the barrier vertically. In this way the barrier 25 may, as a whole, be readily adjusted vertically so as to vary at will the gap between it and the surface of the glass. This enables the radiation from the fire space of the forehearth out to the gathering bay and particularly to the surface of the glass in the gathering bay, to be adjusted. It also permits the adjustment of the draft under the barrier in conjunction with the other draft controls, which are provided. In this way an outdraft of hot gases or flame over the gathering bay and along the surface of the glass therein may be regulated. On the other hand, it is possible to vary the gap under the curtain wall or barrier, for the purpose of assisting in the control of indraft into the fire space of the forehearth in conjunction with the other adjustments provided.

The vertical adjustment of the barrier is also useful upon variations in the level of the glass in the forehearth, as it permits maintenance of the desired gap between the barrier and the surface of the glass, irrespective of the changes in glass level. As the level in the forehearth is the same as that in the furnace, and as changes of level in the furnace are often not corrected for a considerable period of time, it is highly important that the communicating space between the bay and the firing chamber be maintained during these changes in level to assure the maintenance of stable heat conditions in the bay.

In addition to the vertical adjustment of the barrier 25 as a whole, individual sections of the barrier may be adjusted. This is done by rotating individual selected adjusting nuts 38 to raise and lower the threaded rods 36 and with them the individual blocks forming the barrier. This adjustment of the nuts 38 enables the gap under any particular portion of the barrier to be varied at will independently of the gap under other portions.

This permits a local control of the radiation from the interior of the forehearth fire space toward the gathering bay and also of the draft of hot gases or flame which may be projected outwardly over the glass in the gathering bay. In case it should be desired to operate with an indraft under the barrier, such local adjustment of the nuts 38 may also be used to assist in controlling this indraft, if desired. There is therefore provided a control of the local distribution of the heating and draft effects controlled or influenced by the barrier 25.

The front surfaces of the blocks forming the barrier or curtain wall 25 are formed so as to provide a curved front wall suited to the arc of movement of the molds of the shaping machine to be used with the gathering bay and forehearth. This permits the use of suction or gathering molds or receptacles passing in an arc over the gathering bay and having a definite clearance between them and the outer surface of the barrier.

The gathering bay 20, which preferably projects beyond the barrier 25 and the cover 24 of the remainder of the forehearth, may be formed with an arcuate outline as shown in Fig. 2. This permits a gathering zone of maximum area for gathering molds or receptacles which move along an arc during the gathering operation. The gathering bay is so shaped as to expose a portion of the surface of the glass both for forming a gathering zone for suitable contact with suction molds or receptacles for the gathering operation as well as a space for suitable disposal of the "bits" left by severing. The portion exposed may be greater or lesser in area, depending upon the requirements and whether the molds or receptacles are to gather their charges while stationary or while in motion. The gathering area or zone is preferably provided with a suitable cover 46 of refractory material, which covers the gathering bay except at the immediate gathering zone and which is spaced from the surface of the glass. This cover is preferably made removable and may have its inner edges sloped as shown, so as to provide clearance for rising and falling moving molds. The action of the cover 46 is to shield the glass in the gathering bay which does not have to be exposed for gathering and particularly that adjacent to the front and end portions of the bay, and to assist in minimizing the heat loss from these portions. This action of the cover, together with the insulation of the front and end portions, as well as the bottom of the gathering bay, minimizes the lining of cold glass which tends to form along the outer walls and bottom of the gathering bay. Such a lining of cold glass tends to produce cords and streaks in the mold charges gathered from the gathering bay, tends to interfere with the circulation of the glass in the bay, and interferes with the reheating of the cold bits of glass left by the gathering operation. By minimizing these effects, it is easier to keep the glass in the gathering bay in a desirable condition, to circulate the glass properly if desired, to prevent cords or streaks in the mold charges, and to reheat the bits formed by the gathering operation. The covering and insulating of the gathering bay also make it much easier to maintain the glass in the bay at the desired temperature by radiation from the interior of the forehearth and by projection of hot gases or flame out under the barrier, as well as by proper circulatory action of the glass.

To heat the fire space of the forehearth and control the temperature of the glass supplied to the gathering bay, as well as to suitably reheat the cold bits of glass left by the gathering operation, suitable burners 47 are provided which project flame through the ports 48 into the fire space. These burners may be for either gas or liquid fuel, as desired, although gas burners are shown. They are provided with suitable supplies of air and gas under pressure, which may be controlled by suitable individual controlling valves 49 and 50, by which the amount and character of the fire supplied by the burners may be regulated. To assist in the fire control and to exhaust the spent gases in whole or in part, a suitable stack 51 is provided at the rear of the forehearth and just in front of the sealing block 21. This stack exerts a draft on the fire space of the forehearth which draft may be regulated at will by means of a damper 52 whose position is adjustable by the adjusting nut 53 suitably mounted. By turning the nut 53 the draft of the stack may be increased or decreased at will and its effect may be utilized in conjunction with the adjustment of the burners 47 and in conjunction with the adjustment of the barrier or curtain wall 25 to produce various effects. By properly adjusting the burner valves 49 and 50, the temperature in the fire space of the forehearth may be controlled and in this way the temperature and viscosity of the glass supplied by the melting furnace may be brought to the desired point for the gathering operation. If the glass comes from the melting furnace too cold it can be heated as it passes through the forehearth on its way to the gathering bay, and brought to the proper point. If, on the other hand, the glass from the melting furnace should be too hot, it can be cooled on its way to the gathering bay and delivered there at the proper temperature and consistency. The stack damper setting may be employed in conjunction with the burner regulation to use it in this primary temperature regulation. The stack draft may be increased to take care of the larger amount of gases necessary to raise the temperature of the fire space or it may be lowered to prevent excessive draft on a smaller quantity of gases which may be necessary under certain conditions. In this connection the stack draft may be utilized to draw in secondary air for the further combustion either through the burner ports 48 or through additional ports. The stack draft may also be utilized to draw in additional air for cooling the glass if it should prove to be too hot, either through suitable auxiliary ports or through the burner ports 48. In this way the stack damper may be used as an additional means of temperature regulation in conjunction with the burner valves 49 and 50.

In addition to the above uses of the burners for temperature regulation of the fire space in the forehearth, the burners may also be used by suitable regulation in combination with the gap between the lower end of the curtain wall or barrier 25 and the surface of the glass which extends from the interior of the forehearth out to the gathering bay 20. By increasing the amount of fire supplied or by increasing the fuel supply relatively to the air supply, or in some instances by decreasing the air supply relative to the fuel supply, the quantity of flame may be increased or the flame lengthened. This tends to produce an outdraft of hot gases or flame through the gap under the barrier and supplies heat to the glass in the gathering bay and particularly at the gathering zone. This outdraft or projecting flame may be controlled by the burner settings used in combination with the setting of the stack damper. If the stack damper is lowered, it will tend to produce or increase such an outdraft of hot gases or flame. If the stack damper is raised sufficiently, it can be made to produce an indraft of cold air through the gap under the barrier. On the other hand, the stack damper may be set in conjunction with the burner settings so as to produce a neutral condition in this gap under the barrier with neither outdraft nor indraft. By suitably setting the burner valves and the stack damper, the fire in the forehearth may also be thrown forward further toward the barrier or under and beyond it or drawn further back toward the stack, thereby changing the local heating effect in the interior of the fire space of the forehearth. By properly regulating the burner valves and the stack damper, flame or hot gases may be projected through the gap under the barrier and out over the glass in the gathering bay to a suitable degree, and in this manner the glass in the gathering bay and especially at the gathering zone may be kept hot and its temperature regulated. The cold bits or portions of glass left by the gathering operation may also be reheated in this manner.

The relative burner and stack damper settings above described may be used in conjunction with the vertical adjustment either of the barrier 25 as a whole or of the individual blocks 35 forming this barrier. This enables the projected flame or hot gases to be regulated to a greater degree and enables their projection to be controlled locally if desired.

My forehearth is readily adapted for those operations in which the circulation of glass to and from the gathering point is primarily caused by the movement of a mold through the glass, and in which the circulation may be largely a surface one. It may be readily adapted for circulation of the glass in any other desired manner, as by maintenance of different temperature conditions in different strata of the glass or by the use of mechanical means for inducing a circulation in the desired direction. The peculiar shape of the pool and the sealing off of the pool above the surface of the glass permits control of the circulation within the pool itself and thus prevents interference with operations of other machines or apparatus used in connection with the same melting furnace.

Figure 5:
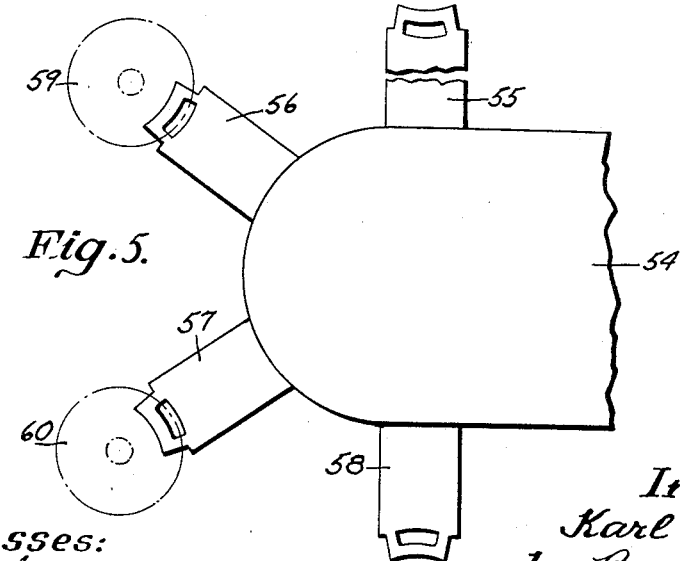
Fig. 5 is a diagrammatic illustration of a single melting furnace provided with a plurality of forehearths of my invention.

In Fig. 5 I have diagrammatically shown a melting furnace 54 provided with four of my forehearths, 55, 56, 57 and 58. Each forehearth is provided with a gathering bay and is adapted to serve a separate shaping machine. Two of these shaping machines for forehearths 56 and 57 are indicated at 59 and 60 respectively. With one and the same temperature of glass supplied by the melting furnace 54, different temperatures of glass may be supplied by the various forehearths to their gathering bays as desired for the various shaping machines. Shaping machine 59, for instance, may be supplied with glass at a higher temperature than that supplied by the melting furnace, and shaping machine 60 may be supplied by glass at a lower temperature than that supplied by the melting furnace. Similarly the temperature of the glass supplied by forehearths 55 and 58 to their respective shaping machines may be different from that supplied to these other two shaping machines. The regulation of the glass to suit the temperature and viscosity required by any one shaping machine will not interfere with the regulation of the temperature and viscosity of the glass in one of the other forehearths, nor will the operation of gathering or circulating the glass in any one forehearth interfere with or influence the operations of gathering and circulating the glass in the other forehearths.

Figure 6:
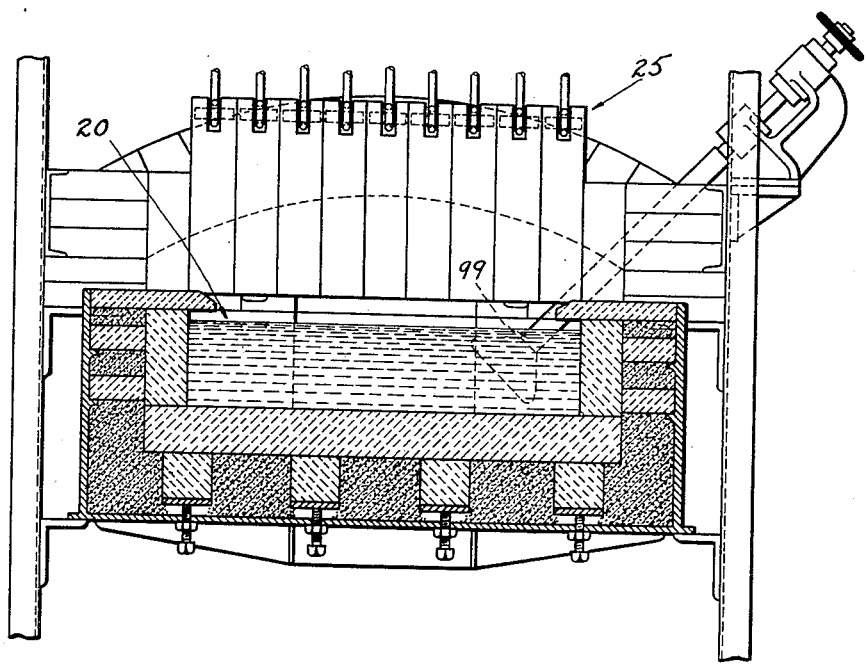
Fig. 6 is a view showing the application to the structure of Figs. 1 to 4 of a one effective form of circulator.

In Fig. 6 I have indicated diagrammatically the application to a gathering pool such as is shown in Figs. 1–4 inclusive, of an improved form of a mechanical circulator 99, similar to that shown and described in my aforesaid prior application Ser. No. 272,956 now Patent No. 1,828,718, and in which the revolving head may be totally submerged at any desired point in the horizontal path of circulation. The head may be revolved in the proper direction to aid in the horizontal circulation and to draw the chilled glass under the surface of the pool.

While as stated, the glass may be circulated in numerous ways, I preferably use suitable mechanical means for positively producing the desired circulation of the glass past the gathering point, as shown for example in my Patents 1,791,634, 1,828,718, and 1,721,487.

The embodiments of my invention herein shown are so shown for the purpose of illustration only, and may be modified in numerous particulars of structure and the method of operation, above described, may be varied without departing from the spirit of my invention as set forth in the appended claims.

I claim:

1. A forehearth for a glass gathering pool adapted for use with a melting furnace, comprising an enclosed glass conditioning chamber, a bay extending outward beyond the enclosed chamber but connected therewith and providing a pool of glass permanently exposed above its surface, means for sealing the conditioning chamber from radiation and gases from the furnace, and temperature controlling means within the conditioning chamber adapted to regulate the temperature and viscosity of the glass in the chamber and in the bay, including means for regulating the draft conditions in the connection between the chamber and the bay, whereby a sting-out flame may be directed across the bay when desired.

2. A forehearth adapted for use with a suction gathering shaping machine and a glass melting furnace, comprising a cooling portion, a heating portion, and an outwardly projecting bay providing an exposed surface of glass for the gathering operations and communicating above the glass line with the heating portion, means for sealing off the space above the glass in the heating portion from the space above the glass in the furnace, heating and draft controlling means in the heating portion, insulating means for minimizing the heat losses through the lower and side portions of the heating portion and bay, and means for selectively regulating the character, position and quantity of heat in the heating portion and over the bay.

3. A forehearth adapted for use with a suction gathering shaping machine and a glass melting furnace comprising an inclosed glass conditioning chamber, means for supplying heating gases to said chamber, a projecting bay providing an upwardly facing pool of glass permanently exposed above its surface for the collection of mold charges into suction gathering molds of the shaping machine, said gas supplying means including means for causing an outdraft or indraft between the chamber and bay, an adjustable barrier or curtain extending across substantially the full width of the bay and separating the conditioning chamber from the bay, and means for adjusting the barrier toward and from the surface of the glass, whereby the outdraft or indraft is controlled during gathering operations of said machine to vary the temperature of the glass in the bay or to maintain the glass in the bay at constant temperature.

4. A forehearth adapted for use with a suction gathering shaping machine and a glass melting furnace, and comprising a glass-containing basin, the forward end of which provides a bay permanently exposed above its surface, a cover for the basin permanently located rearwardly of the bay, means for regulating the temperature and viscosity of the glass under the cover, said means acting independently of the furnace, a curtain or barrier constituting a front wall for the cover, and means for moving the barrier toward and from the surface of the glass to regulate the application of heat to the surface of the glass in the bay during gathering operations of said machine.

5. A forehearth adapted for use with a suction gathering shaping machine and a glass melting furnace, and comprising a glass-containing basin, the forward end of which provides an exposed bay, a cover for the basin rearwardly of the bay, means for regulating the temperature and viscosity of the glass under the cover, said means acting independently of the furnace, a curtain or barrier constituting a front wall for the cover, means for moving the barrier toward and from the surface of the glass to regulate the application of heat to the surface of the glass in the bay, means for minimizing the dissipation of heat from the bottom and side walls of the glass-containing portion of the forehearth, and a cover above and spaced from the portions of the glass in the bay adjacent the walls thereof.

6. A forehearth adapted for use with a suction gathering shaping machine and a melting furnace, comprising a glass-containing basin, the outer portions of which provide an upwardly facing gathering pool, a cover for the forehearth having a front wall adjacent the exposed pool and composed of individually adjustable sections, means for moving each section toward and from the surface of the glass and means independent of the furnace, for generating heat under the cover and for regulating the draft under the front wall thereof.

7. A forehearth adapted for use with a suction gathering machine and a melting furnace, comprising a glass-containing basin, the outer portions of which provide an upwardly facing gathering pool, a cover for the forehearth having a front wall adjacent the exposed pool and composed of individually adjustable sections, means for moving each section toward and from the surface of the glass, means for adjusting the sections simultaneously toward and from the glass and means independent of the furnace for generating heat under the cover and for regulating the draft under the front wall thereof.

8. A forehearth adapted for use with a suction gathering glass shaping machine and a glass melting furnace, comprising a basin adapted to receive molten glass from the furnace and providing an upwardly exposed gathering pool, a cover for the edges of said pool and spaced from the surface of the glass, insulation on the bottom and sides of the basin, a firing chamber above the basin and permanently located rearwardly of the pool heat separated from the furnace and having a front wall projecting downwardly toward the glass, means for varying the height of said front wall to vary the space between the surface of the glass and the bottom of the wall, firing means in the chamber, and means for controlling the firing means to vary the position and character of the fire, whereby the exposed surface of the glass in the gathering pool may be heated or cooled as desired and to an extent depending upon the vertical position of said front wall.

9. A forehearth adapted for use with a glass melting furnace and a suction gathering shaping machine comprising a permanently covered portion and an upwardly faced permanently exposed portion, a passageway between said portions above the surface of the glass therein, means for heat separating the forehearth from the furnace while permitting a flow of glass by gravity from the furnace to the forehearth, means for reducing the temperature of the glass as it flows into the forehearth, heating means for thereafter heating the glass in the covered portion, a stack having an adjustable damper, and means for setting said damper in fixed position, whereby the draft in the covered portion and over the exposed portion of the forehearth may be regulated as desired.

10. A container for molten glass adapted for use with a glass melting furnace and a suction gathering shaping machine, comprising a cooling portion, an inclosed heating portion and an exposed gathering bay, means independent of the furnace for heating the heating portions and the bay, a barrier separating the bay from the heating portion and arranged to control the effect of the heating means on the bay, and means for adjusting the barrier toward and from the surface of the glass to vary the extent of communication between the heating portion and the bay to vary the temperature of the glass in the bay to adapt it for the operations of the suction gathering machine.

11. A container for a pool of molten glass adapted for use with a glass melting furnace and a suction gathering machine, comprising a glass containing basin, a stationary cover structure for said basin cooperating with the walls thereof to provide a stationary conditioning chamber of fixed length extending from the furnace to a point short of the outer extremity of the pool, said extremity being permanently exposed above its surface, a front wall for the conditioning chamber projecting downwardly to a point adjacent the surface of the glass and partially separating the gathering bay and the conditioning chamber but providing a passage therebetween above the glass, means associated with the chamber and independent of the furnace for heating the chamber, a stack associated with the chamber and having an adjustable damper for controlling the draft in the chamber, said damper being adapted to cause said heating means to heat said bay during the operation of said machine, and means for adjusting the wall toward and from the glass whereby the cross-sectional area of said passage may be varied to control the extent of draft inwardly or outwardly of the conditioning chamber and over the gathering bay, and thus to maintain the glass in the bay at the desired temperature and viscosity.

12. A forehearth adapted for use with a suction gathering glass shaping machine and a melting furnace, comprising a basin adapted to receive glass from the furnace by gravity, a stationary cover for a portion of said basin defining a stationary conditioning chamber and an exposed gathering bay, said cover having an adjustable front wall, means operable during the gathering operation of said machine for heating said chamber and bay and including means for causing a draft outwardly or inwardly of said bay during the gathering operations of said machine, and means for adjusting said wall toward and from the glass in the basin to follow variations of level of glass in the basin and to maintain the desired communication between the conditioning chamber and the bay to aid in the regulation of the heat exchange between the conditioning chamber and the bay to thereby control the viscosity of the glass on the surface of the gathering bay.

13. A forehearth adapted for use with a suction gathering glass shaping machine and a melting furnace, comprising a stationary conditioning chamber independent of the furnace and a permanently exposed gathering bay, and having a channel through which glass from the melting furnace may pass through the conditioning chamber to the bay, means for directing a sting-out flame from the chamber over the bay, and means for regulably controlling the application of the sting-out flame to the surface of the glass in the bay.

14. A forehearth for use with a suction gathering shaping machine and a melting furnace, said forehearth communicating at one end with the melting furnace, and at the other providing an upwardly facing permanently exposed gathering pool and having an inclosed stationary conditioning chamber extending substantially from the furnace to a point adjacent the exposed pool, and adjustable means at either end of the conditioning chamber adapted to jointly and severally control the draft conditions over the exposed pool.

15. A forehearth for use in connection with a glass melting furnace, comprising an inclosed glass conditioning chamber independent of the furnace and a permanently exposed gathering bay, a suction gathering machine adapted to remove charges of glass from the surface of the pool, and means for varying the relative pressure in the conditioning chamber and on the surface of the glass in the gathering bay during the gathering operations of said machine.

16. In combination with a glass melting furnace, a forehearth having a firing space independent of the furnace and a stationary gathering bay projecting therebeyond permanently exposed above its surface, the firing space being separated from the space over the gathering bay by a barrier extending toward but not to the glass, means for regulating the extent to which the barrier approaches the glass and means for controlling the relative pressures on both sides of the barrier.

17. The method of conditioning the glass of a gathering pool, which comprises the steps of flowing molten glass through an inclosed channel from a glass melting tank to a permanently open stationary gathering bay, controlling the temperature and condition of the glass during its passage through the inclosed channel independently of radiation from and draft conditions in the furnace, and controlling the temperature and condition of the glass in the gathering bay by variably regulating the communication between the inclosed channel and the bay.

18. The method of controlling the condition of glass in a permanently exposed stationary gathering bay, which comprises flowing the glass from a melting furnace by gravity through a conditioning chamber, controlling the temperature conditions in said chamber independently of the temperature conditions in the furnace, passing the glass thence into the gathering bay and past a gathering point, and returning it to the conditioning chamber for reconditioning and selectively controlling the draft and temperature condition on the surface of the exposed glass by variably regulating the passage of temperature controlling media above the glass between the conditioning chamber and the bay.

19. A forehearth adapted for connection at one end to a glass melting furnace and providing at the other end a permanently exposed pool of molten glass from which gathers of glass may be collected by suction molds, comprising a glass containing basin terminating in a relatively wide permanently exposed bay, a stationary cover structure for portions of the basin cooperating with the wall thereof to provide a conditioning chamber rearwardly of the bay, a front wall for the conditioning chamber extending downwardly to a point adjacent the surface of the glass and partially separating the bay from the conditioning chamber, means associated with the chamber and independent of the furnace for heating the chamber, a stack associated with the chamber and having an adjustable damper for controlling the draft in the chamber, means for effecting a fixed setting of said damper independently of the gathering of glass by said molds, means for adjusting the wall toward and from the glass whereby to control the extent of draft inwardly or outwardly of the conditioning chamber and over the bay, and means for circulating the glass entering the forehearth in a path wholly within the forehearth and bay.

20. A forehearth adapted for connection at one end to a glass melting furnace and providing at the other end a permanently exposed pool of molten glass from which gathers of glass may be collected by suction molds, comprising a glass containing basin providing a relatively narrow channel adjacent the furnace flaring outwardly from the furnace and terminating in a relatively wide exposed bay, a cover structure for portions of the basin cooperating with the walls thereof to provide a conditioning chamber rearwardly of the bay, a front wall for the conditioning chamber extending downwardly to a point adjacent the surface of the glass and partially separating the bay from the conditioning chamber, and composed of separately adjustable sections, means for adjusting the sections to independent selected positions to control locally the exchange of heat between selected portions of the bay and the conditioning chamber, means associated with the chamber and independent of the furnace for heating the chamber, a stack associated with the chamber and having an adjustable damper for controlling the draft in the chamber, means for adjusting the wall as a whole toward and from the glass whereby to control the extent of draft inwardly or outwardly of the conditioning chamber and over the bay, and means for circulating the glass entering the forehearth in a path wholly within the forehearth and bay.

21. The method of conditioning glass for use in supplying suction gathering molds which comprises, flowing glass from a melting furnace through an enclosed conditioning chamber toward and through an exposed gathering pool, cooling the glass as it leaves the furnace, circulating the glass in a closed path wholly outside of the furnace, heating the glass while circulating it, and regulably and selectively controlling the application of heat to different portions of the surface of the glass while it is in the exposed pool.

22. Apparatus for providing a pool of molten glass from the surface of which charges of glass are removed by the molds of a suction gathering machine, which comprises a glass melting furnace, a stationary forehearth, a channel for conducting glass from the furnace to the forehearth, a stationary heating chamber enclosing said forehearth, the glass containing portion of said forehearth being extended outwardly beyond said chamber to provide a stationary bay, said bay being permanently open above the surface of the glass therein for access to the glass by said molds at all times during the operation of said machine, an unobstructed glass passageway leading into said bay, a movable barrier constituting at least a portion of the front wall of said chamber extending substantially the full width of said bay, and separating the interior of the chamber from the bay, temperature controlling means within said chamber and including means effective to direct a sting-out flame from the chamber beneath the barrier and across the surface of the glass in the bay, and means for variably regulating the application of said flame to the glass in the bay including means for moving said barrier toward and away from the surface of the glass.

Signed at Hartford, Connecticut, this 16th day of August, 1929.

KARL E. PEILER.